US012478940B2

(12) United States Patent
Yu et al.

(10) Patent No.: US 12,478,940 B2
(45) Date of Patent: Nov. 25, 2025

(54) METHANE CRACKING APPARATUS

(71) Applicants: Hyundai Motor Company, Seoul (KR); Kia Corporation, Seoul (KR); AJOU UNIVERSITY INDUSTRY-ACADEMIC COOPERATION FOUNDATION, Gyeonggi-do (KR)

(72) Inventors: Jung Han Yu, Gyeonggi-do (KR); Joo Young Kim, Gyeonggi-do (KR); Yu Kwon Kim, Seoul (KR); Hyung Tak Seo, Seoul (KR); Jin A Kim, Gyeonggi-do (KR); Young Jae Lee, Gyeonggi-do (KR)

(73) Assignees: Hyundai Motor Company, Seoul (KR); Kia Corporation, Seoul (KR); Ajou University Industry-Academic Cooperation Foundation, Gyeonggi-do (KR)

( * ) Notice: Subject to any disclaimer, the term of this patent is extended or adjusted under 35 U.S.C. 154(b) by 646 days.

(21) Appl. No.: 17/892,471

(22) Filed: Aug. 22, 2022

(65) Prior Publication Data
US 2023/0285921 A1    Sep. 14, 2023

(30) Foreign Application Priority Data
Mar. 14, 2022   (KR) .......................... 10-2022-0031674

(51) Int. Cl.
*B01J 12/00*   (2006.01)
*B01J 4/00*   (2006.01)
(Continued)

(52) U.S. Cl.
CPC ............. *B01J 12/005* (2013.01); *B01J 4/004* (2013.01); *B01J 4/008* (2013.01); *B01J 10/005* (2013.01);
(Continued)

(58) Field of Classification Search
CPC .............. C01B 3/26; C01B 2203/0277; C01B 2203/1088; C01B 2203/1241;
(Continued)

(56) References Cited

U.S. PATENT DOCUMENTS 4,552,667 A * 11/1985 Shultz ...................... A62D 3/32
                                                          588/314
4,555,327 A    11/1985 Plummer
(Continued)

FOREIGN PATENT DOCUMENTS

CA    2284985 C * 8/2008 ............. B22D 17/30
CA    2651406 C * 3/2012 ................ C10J 3/00
(Continued)

OTHER PUBLICATIONS

Machine Translation of JP-2004043953-A (Apr. 22, 2025) (Year: 2025).*
(Continued)

*Primary Examiner* — Matthew J Merkling
(74) *Attorney, Agent, or Firm* — Fox Rothschild LLP

(57) ABSTRACT

A methane cracking apparatus includes a supply pipeline that supplies a gas, a reactor having an interior space, and in which a catalyst for decomposing the gas may be disposed in the interior space, an agitator provided in the interior space and that agitates a material in the interior space, a first discharge pipeline connected to the reactor and that discharges decomposition materials generated as the gas may be decomposed, and a second discharge pipeline connected to the reactor, that discharges the decomposition materials, and disposed on an upper side of the first discharge pipeline.

18 Claims, 11 Drawing Sheets

(51) Int. Cl.
  *B01J 10/00* (2006.01)
  *B01J 19/00* (2006.01)
  *B01J 19/18* (2006.01)
  *C01B 3/26* (2006.01)

(52) U.S. Cl.
  CPC ....... *B01J 19/0066* (2013.01); *B01J 19/1812* (2013.01); *C01B 3/26* (2013.01); *B01J 2219/00006* (2013.01); *B01J 2219/00166* (2013.01); *B01J 2219/00189* (2013.01); *B01J 2219/002* (2013.01); *B01J 2219/00761* (2013.01); *B01J 2219/185* (2013.01); *C01B 2203/0277* (2013.01); *C01B 2203/1088* (2013.01); *C01B 2203/1241* (2013.01)

(58) Field of Classification Search
  CPC . B01J 12/005; B01J 4/004; B01J 4/008; B01J 10/005; B01J 19/0066; B01J 19/1812; B01J 2219/00006; B01J 2219/00166; B01J 2219/00189; B01J 2219/002; B01J 2219/00761; B01J 2219/185
  See application file for complete search history.

(56) References Cited

U.S. PATENT DOCUMENTS

| | | | |
|---|---|---|---|
| 5,767,165 A * | 6/1998 | Steinberg | C01B 3/34 518/703 |
| 6,358,480 B1 | 3/2002 | Kuroki | |
| 7,238,847 B2 | 7/2007 | Ngan | |
| 10,207,922 B2 * | 2/2019 | Stiller | C01B 3/24 |
| 12,168,606 B2 * | 12/2024 | Goetheer | B01D 53/047 |
| 2003/0056438 A1 * | 3/2003 | Garnier | C10K 1/04 48/197 FM |
| 2006/0228286 A1 * | 10/2006 | Tada | C01B 3/26 422/150 |
| 2020/0148957 A1 | 5/2020 | Reverso et al. | |
| 2020/0269176 A1 * | 8/2020 | Shinoda | B01D 45/12 |
| 2021/0061654 A1 * | 3/2021 | McFarland | B01J 35/27 |
| 2021/0380407 A1 * | 12/2021 | Ashton | C01B 3/24 |
| 2022/0396479 A1 * | 12/2022 | Yurchenko | C01B 3/501 |
| 2024/0425369 A1 * | 12/2024 | Okoniewski | B01J 19/087 |

FOREIGN PATENT DOCUMENTS

| | | | | |
|---|---|---|---|---|
| CN | 111422831 A | | 7/2020 | |
| JP | H 10-120401 A | | 5/1998 | |
| JP | 3096448 B2 | | 10/2000 | |
| JP | 2004043953 A | * | 2/2004 | |
| KR | 10-2021-0110504 A | | 9/2021 | |
| RU | 2760381 C1 | * | 11/2021 | ............ B01J 8/0055 |
| WO | WO-2019187909 A1 | * | 10/2019 | |

OTHER PUBLICATIONS

Machine Translation of WO-2019187909-A1 (Apr. 22, 2025) (Year: 2025).*

* cited by examiner

METHANE CRACKING APPARATUS

CROSS-REFERENCE TO RELATED APPLICATION

This application claims under 35 U.S.C. § 119(a) the benefit of priority to Korean Patent Application No. 10-2022-0031674, filed in the Korean Intellectual Property Office on Mar. 14, 2022, the entire contents of which is incorporated herein by reference.

TECHNICAL FIELD

The present disclosure relates to a methane cracking apparatus.

BACKGROUND

To produce hydrogen from methane, a steam methane reforming (SMR) process of bringing methane and water into reaction with each other is mainly used in the industries. However, when hydrogen is produced from methane through the SMR process, carbon dioxide is additionally produced.

Discharge of carbon dioxide may be a cause of environmental problems in the SMR process, and additional separation processes in several steps are necessary to secure hydrogen of a high purity by separating carbon dioxide.

Accordingly, technologies for overcome a limit of the SMR process and replace the SMR process is necessary to produce clear hydrogen, and one of them is a methane cracking technology. Methane cracking is a technology of obtaining hydrogen and carbon in a solid state through a decomposition reaction of methane, and is spotlighted in that carbon dioxide is not discharged.

However, when a solid catalyst (a solid catalyst in a form, in which nickel, iron, cobalt, and the like are dispersed in a support, such as alumina or zirconia) is used, the generated carbon is deposited in the solid catalyst and becomes a cause of reduction of activities of the catalyst. When the activities of the catalyst are degraded due to deposition of carbon, a conversion rate of the methane becomes lower, and thus, it is difficult to continue the methane cracking operation while the conversion rate of the methane of a specific level is secured. Furthermore, to reuse a catalyst, in which carbon is deposited, a process of reproducing the catalyst, in which the carbon is deposited, and a catalyst purifying process are necessary, and in this process, carbon dioxide may be generated and a life span of the catalyst may be shortened. For this reason, the methane cracking using the solid catalyst has a technical limit.

To overcome the technical limits, the generated carbon may be restrained from being deposited in the catalyst by allowing the methane gas to pass through the molten metal catalyst of a high temperature of around 1,000° C. in a form of bubbles. This is because the methane is decomposed to hydrogen and carbon and the generated carbon in the solid state moves to an upper side of the molten metal catalyst layer as a density of the carbon is lower than that of the metal when C—H bonding of the methane molecules is broken as the energy of the methane molecules exceeds an activation energy under the molten metal catalyst of the high temperature. However, when carbon is not removed at a proper time even though the carbon is formed on the molten metal catalyst layer of the high temperature, several problems, such a degradation of a purity of hydrogen and a rise of pressure whereby a continuous operation may not be possible.

Meanwhile, to increase a conversion rate of the methane in the methane cracking reaction, a reaction temperature, activation of the catalyst, a reaction time for the methane and the catalyst, and the like may be important. To enhance the conversion rate of the methane in a process, in which the reaction temperature and the catalyst are determined, a process design for securing a sufficient reaction time for the methane and the catalyst may be necessary.

When a large amount of the molten metal catalyst layers are formed by making the reactor as compared with the amount of the supplied methane large while the reactor is manufactured to bring the methane and the catalyst into reaction with each other for a sufficient time, the conversion rate of the methane increases. However, in this case, use of an excessive amount of the catalyst may be disadvantageous in an economical aspect.

Furthermore, when a size of the reactor is excessively large, a temperature deviation and an even composition of the molten metal catalyst in the interior of the reactor may be caused whereby there may be a limit in derivation of a stable reaction. Accordingly, a technology for securing a high conversion rate of the methane while reducing the size of the reactor may be desirable.

SUMMARY

The present disclosure has been made to solve the above-mentioned problems occurring in the existing technologies while advantages achieved by the existing technologies may be maintained intact.

An exemplary embodiment of the present disclosure provides a methane cracking apparatus that may increase a conversion rate of methane.

The technical problems to be solved by the present disclosure may not be limited to the aforementioned problems, and any other technical problems not mentioned herein will be clearly understood from the following description by those skilled in the art to which the present disclosure pertains.

In an example, a methane cracking apparatus includes a supply pipeline that supplies a gas, a reactor having an interior space, and in which a catalyst for decomposing the gas may be disposed in the interior space, an agitator provided in the interior space that agitates a material in the interior space, a first discharge pipeline connected to the reactor and that discharges decomposition materials generated as the gas may be decomposed, and a second discharge pipeline connected to the reactor, that discharges the decomposition materials, and disposed on an upper side of the first discharge pipeline.

In an example, the agitator may include a rotary shaft extending upwards and downwards, and a blade coupled to the rotary shaft, disposed in the interior space, and rotated in conjunction with rotation of the rotary shaft, and the blade may have a spiral shape extending upwards and downwards while the rotary shaft may be taken proximate to a center of the blade.

In an example, the first discharge pipeline may be located on a lower side of an upper end of the blade.

In an example, the methane cracking apparatus may further include a first discharge valve disposed in the first discharge pipeline and that opens and closes the first discharge pipeline.

In an example, the second discharge pipeline may be located on an upper side of an upper end of the blade.

In an example, the methane cracking apparatus may further include a second discharge valve disposed in the second discharge pipeline and that opens and closes the second discharge pipeline.

In an example, the methane cracking apparatus may further include a first filter part disposed in the second discharge pipeline and that filters the decomposition materials.

In an example, the methane cracking apparatus may further include a first pressure sensor disposed in the second discharge pipeline and disposed on a downstream side of the first filter part, and a second pressure sensor disposed in the second discharge pipeline and disposed on an upstream side of the first filter part.

In an example, the methane cracking apparatus may further include a heater coupled to an outside of the reactor and that heats the reactor.

In an example, the methane cracking apparatus may further include a storage connected to the first discharge pipeline and that stores a first material that may be any one of the decomposition materials.

In an example, the methane cracking apparatus may further include a connection pipeline that connects the storage and the second discharge pipeline.

In an example, the methane cracking apparatus may further include a second filter part disposed in the connection pipeline and that filters a material discharged from the storage.

In an example, the methane cracking apparatus may further include when an area of the connection pipeline, which may be close to the storage with respect to the second filter part, may be an upstream area and an area of the connection pipeline, which may be close to the second discharge pipeline, may be a downstream area, a third pressure sensor disposed in the upstream area, and a fourth pressure sensor disposed in the downstream area.

In an example, the methane cracking apparatus may further include a connection valve disposed in the connection pipeline and that opens and closes the connection pipeline.

In an example, a liquid may be disposed in an interior of the storage, and an end of the first discharge pipeline may be disposed to be immersed in the liquid.

In an example, the methane cracking apparatus may further include a heat exchanger coupled to the first discharge pipeline and that cools the first discharge pipeline.

In an example, when the blade may be divided to a plurality of areas along an upward/downward direction and distances, by which the plurality of areas may be spaced apart from each other along the upward/downward direction, may be pitches, the pitches may be set to be different in at least any two of the plurality of areas.

In an example, when the blade may be divided to a plurality of areas along an upward/downward direction and angles thereof with imaginary planes that may be perpendicular to the upward/downward direction when the plurality of area may be viewed along a direction that may be perpendicular to the upward/downward direction may be reference angles, the reference angles may be set to be different in at least any two of the plurality of areas of the blade.

In an example, the methane cracking apparatus may further include a first detection sensor that detects whether a first material that may be any one of the decomposition materials may be present in a reference direction that may be one direction that may be perpendicular to an upward/downward direction, and a second detection sensor disposed on an upper side of the first detection sensor and that detects whether the first material may be present in the reference direction.

In an example, the methane cracking apparatus may further include storage connected to the first discharge pipeline and that stores the first material, a connection pipeline that connects the storage and the second discharge pipeline, a first discharge valve disposed in the first discharge pipeline and that opens and closes the first discharge pipeline, a second discharge valve disposed in the second discharge pipeline and that opens and closes the second discharge pipeline, a connection valve disposed in the connection pipeline and that opens and closes the connection pipeline, and a controller that opens and closes the first discharge valve, the second discharge valve, and the connection valve, based on information acquired by the first detection sensor and the second detection sensor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
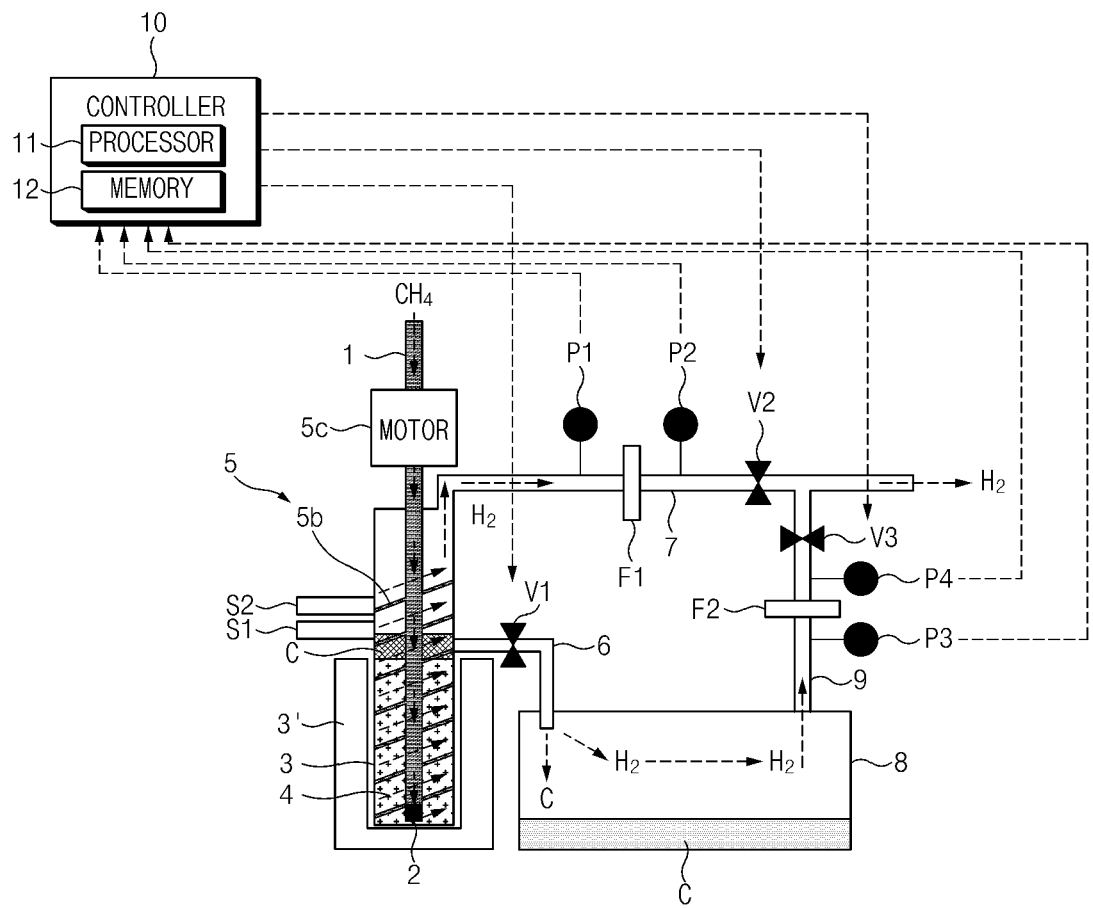
FIG. 1 is a view conceptually illustrating a methane cracking apparatus according to a first embodiment of the present disclosure.

Hereinafter, some embodiments of the present disclosure will be described in detail with reference to the exemplary drawings. In providing reference numerals to the constituent elements of the drawings, the same elements may have the same reference numerals even if they may be displayed on different drawings. Further, in the following description of the present disclosure, a detailed description of known functions and configurations incorporated herein will be omitted when it may make the subject matter of the present disclosure rather unclear.

First Embodiment

FIG. 1 is a view conceptually illustrating a methane cracking apparatus according to a first embodiment of the present disclosure. The methane cracking apparatus according to the first embodiment of the present disclosure may be an apparatus for cracking methane to decompose the methane into carbon and hydrogen. The methane cracking apparatus may include a supply pipeline 1, a reactor 3, an agitator 5, a first discharge pipeline 6, and a second discharge pipeline 7.

The supply pipeline 1 may be configured to supply a gas. The gas may be methane. Hereinafter, the gas will be described as methane for convenience of understanding. The supply pipeline 1 may extend along an upward/downward direction.

A porous filter 2 may be coupled to a distal end of the supply pipeline 1. Because the porous filter 2 may be coupled to the distal end of the supply pipeline 1, small bubbles may be formed in the methane whereby a reaction area thereof with a catalyst 4 may be increased. The porous filter 2 may include at least any one of silicon carbide, alumina, zirconia, and magnesia. However, a material of the porous filter 2 may not be particularly limited thereto, and any material, by which bubbles may be formed in the methane, may be applied.

A porosity of the porous filter 2 may be 60 pores per inch (PPI) to 100 PPI. When the porosity may be less than 60 PPI, a pressure in the supply pipeline 1 may be increased during a reaction due to the low porosity. When the porosity may be more than 100 PPI, excessively large bubbles may be generated in the methane and a conversion rate of the methane may become lower.

Sizes of diameters of the pores may be 40 μm to 250 μm. When the diameters may be less than 40 μm, a pressure in the supply pipeline 1 may be increased during a reaction due to the small diameters. When the diameters may be more than 250 μm, the bubbles of the methane may be generated excessively whereby the conversion rate of the methane may become lower.

The reactor 3 may have an interior space, and the catalyst 4 configured to decompose the methane may be disposed in the interior space. The catalyst 4 may be a molten metal. A temperature of the catalyst 4 may be 950° C. to 1200° C. The conversion rate may be decreased when the temperature of the catalyst 4 may be less than 950° C., and excessive energy may be consumed to heat the reactor 3 when the temperature of the catalyst 4 may be more than 1200° C. A heater 3' for heating the reactor 3 may be provided on an outside of the reactor 3.

Because the catalyst 4 that may be the molten metal of a high temperature may be included in the interior of the reactor 3, the reactor 3 may be formed of a stable material at a high temperature. Furthermore, the reactor 3 may be formed of a material having a low reaction rate with the catalyst 4. As an example, the reactor 3 may be formed of one or more of alumina, graphite, pyrolytic boron nitride (PBN), quartz, tantalum (Ta), and tungsten (W). A high temperature described herein may be the temperature to maintain the metal in a molten state and/or permit the desired reaction of the gas and catalyst, such as 950° C. to 1200° C. A low reaction may be one in which a reaction of the materials of the catalyst, gas(ses) or other materials present in the reactor react with the reactor at a rate that is sufficiently slow so that the reactor can perform the functions described herein and/or may have a desired lifespan to be used as a catalyst for the given reactions for a desired period of time.

The catalyst 4 may include one or a combination of two or more of nickel (Ni), bismuth (Bi), tin (Sn), copper (Cu), indium (In), gallium (Ga). For enhancement of the conversion rate, one or two elements of sodium (Na), potassium (K), magnesium (Mg), and calcium (Ca) may be added to the catalyst 4.

The agitator 5 may be provided in the interior space and may be configured to agitate the materials in the interior space. The materials may be the catalyst 4 and the methane. The agitator 5 may agitate the materials in the interior space while rotating about a rotary shaft 5a that extends in an upward/downward direction.

Figure 2:
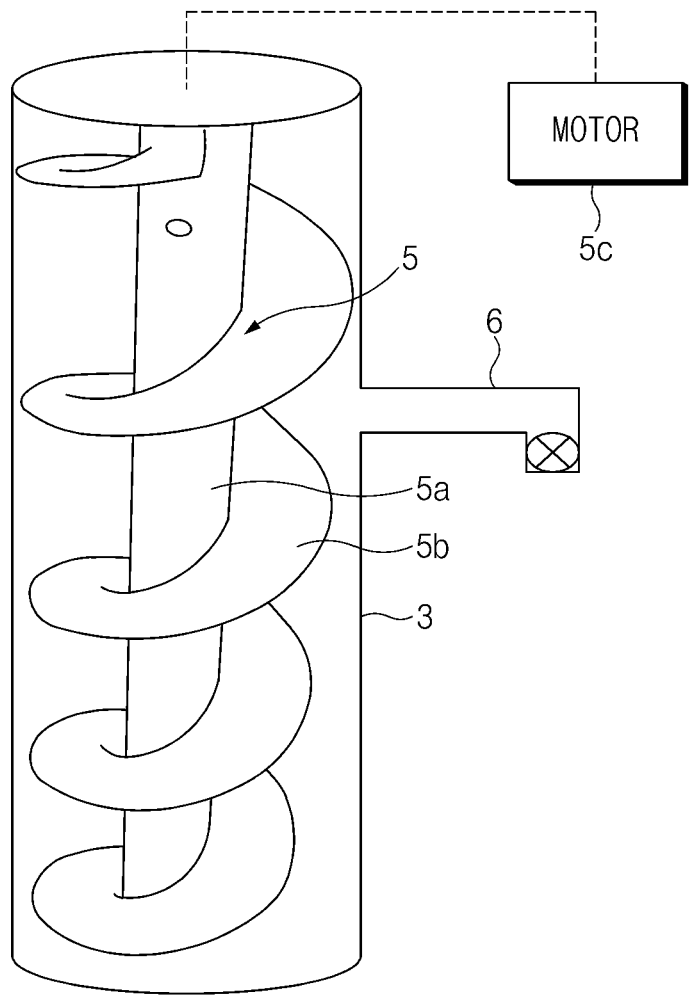
FIG. 2 is a view conceptually illustrating an agitator.

FIG. 2 is a view conceptually illustrating the agitator. The agitator 5 may include the rotary shaft 5a and a blade 5b. The blade 5b may be coupled to the rotary shaft 5a and be disposed in the interior space to be rotated in conjunction with the rotation of the rotary shaft 5a. As an example, the blade 5b may have a spiral shape that extends in the upward/downward direction while the rotary shaft 5a may be taken as a center thereof. However, this may be a mere example, and various modifications may be made in a range for agitating the material in the interior space.

According to the present disclosure, the bubbles of the methane may be restrained from rising in a vertical direction through the rotating blade 5b, a stay time of the methane in the reactor 3 may be increased as the methane may be rotated together in a rotational direction of the blade 5b, and the conversion rate may be increased as a contact time of the methane and the molten metal catalyst 4 may be increased.

An upper end of the blade 5b may be located higher than the catalyst 4. The carbon generated as the methane may be decomposed may have a density that may be lower than that of the catalyst 4 and thus may be located above the catalyst 4. Because the upper end of the blade 5b may be higher than the catalyst 4, the generated carbon may be easily phase-separated from the catalyst 4 to be located at an upper end of the catalyst 4, and a sufficient reaction may be derived as a reaction time of the methane and the catalyst 4 may be secured.

Carbon powder floated on the gas flows tend to spatter to an upper side. The upper end of the blade 5b may be configured such that a path located higher than the catalyst 4 is defined along which the carbon powder flows along with the gas flows when the methane gas is guided to flow while rotating along the blade 5b. The path defined by the upper end of the blade 5b may be configured whereby an amount of the methane powder that reaches to the second discharge pipeline 7, which will be described below, may be decreased. Because the second discharge pipeline 7 may be a pipe for discharging hydrogen, a purity of the hydrogen may be increased.

Furthermore, the blade 5b may function to push the carbon powder laid on a surface of the catalyst 4 upwards to push away the carbon powder to a first pipeline 6, which will be described below, through rotation thereof. The first discharge pipeline may be a pipe for discharging carbon, and thus may efficiently discharge the carbon.

The rotary shaft 5a may be coupled to a motor 5c. The motor 5c may rotate the rotary shaft 5a at a speed of 20 rpm to 50 rpm. When the motor 5c may be operated at less than 20 rpm, it may be difficult for the bubbles to be uniformly distributed in the catalyst due to slow rotation of the blade 5b. Furthermore, when the motor 5c may be operated at more than 50 rpm, a stay time of the methane may become shorter due to excessive rotation thereof and it may be difficult to form a stable carbon layer.

An interval between the blade 5b and an inner wall of the reactor 3 may be 0.2 mm or less. When the interval between the blade 5b and the inner wall of the reactor 3 may be more than 0.2 mm, some of the methane bubbles do not flow in the rotational direction of the blade 5b and flow to an aperture between the blade 5b and the inner wall of the reactor 3 whereby the conversion rate of the methane may be reduced. Furthermore, when the blade 5b and the inner wall of the reactor 3 contact each other, the reactor 3 and the blade 5b may be damaged during the rotation of the blade 5b.

Meanwhile, the pitches of the blade 5b may be constant. The pitches may mean distances, by which a plurality of areas of the blade 5b divided along the upward/downward may be spaced apart from each other along the upward/downward direction.

The first discharge pipeline 6 may be connected to the reactor 3. The first discharge pipeline 6 may be configured such that decomposition materials generated as the methane may be decomposed may be discharged therethrough. The decomposition materials may be carbon and hydrogen. The first discharge pipeline 6 may be located on a lower side of the upper end of the blade 5b.

Furthermore, the first discharge pipeline 6 may be connected to storage 8. The storage 8 may be connected to the first discharge pipeline 6, and may be configured to store a first material "C" that may be any one of the decomposition materials. The first material "C" may be in a solid state. As an example, the first material "C" may be carbon. The first discharge pipeline 6 may be a pipeline for discharging, among the decomposition materials, the first material "C".

The second discharge pipeline 7 may be connected to the reactor 3 and may be configured such that decomposition materials may be discharged therethrough. The second discharge pipeline 7 may be disposed on an upper side of the first discharge pipeline 6. Furthermore, the second discharge pipeline 7 may be located on an upper side of the upper end of the blade 5b. The second discharge pipeline 7 may be a pipeline for discharging, among the decomposition materials, a second material. The second material may be in a gaseous state. For example, the second material may be hydrogen. Because the second material may be in the gaseous state, it may be discharged through the second discharge pipeline 7 even when it may be located on the upper side of the upper end of the blade 5b.

Hereinafter, additional elements of the methane cracking apparatus according to the first embodiment of the present disclosure will be described below. The additional elements of the methane cracking apparatus according to the first embodiment of the present disclosure may be a first discharge valve V1, a second discharge valve V2, a first filter part F1, a first pressure sensor P1, a second pressure sensor P2, a connection pipeline 9, a connection valve V3, a second filter part F2, a third pressure sensor P3, a fourth pressure sensor P4, a first detection sensor S1, a second detection sensor S2, and a controller 10.

The first discharge valve V1 may be disposed in the first discharge pipeline 6 and may be configured to open and close the first discharge pipeline 6. The second discharge valve V2 may be disposed in the second discharge pipeline 7 and may be configured to open and close the second discharge pipeline 7.

The first filter part F1 may be disposed in the second discharge pipeline 7 and may be configured to filter the decomposition materials. Here, an operation of filtering the decomposition materials may mean that some of the decomposition materials may be allowed to pass and some of the decomposition materials may be prohibited from passing. As an example, the first filter part F1 may filter out, among the composition materials, the first material "C" and may allow the second material to pass through the second discharge pipeline 7. The second discharge pipeline 7 may be a pipeline for discharging the second material, but a portion of the first material "C" may be introduced into the second discharge pipeline 7 together. This may reduce a purity of the second material, and thus the first material "C" may be filtered out through the first filter part F1.

The first pressure sensor P1 may be disposed in the second discharge pipeline 7 and may be disposed on a downstream side of the first filter part F1. The first pressure sensor P1 may be configured to measure a pressure on the downstream side of the first filter part F1. Meanwhile, the expressions of an upstream and a downstream in the present disclosure may be with reference to a flow direction. For example, when a fluid flows from a left side to a right side, the left side may correspond to an upstream side and the right side may correspond to a downstream side.

The second pressure sensor P2 may be disposed in the second discharge pipeline 7 and may be disposed on an upstream side of the first filter part F1. The second pressure sensor P2 may be configured to measure a pressure on the upstream side of the second filter part F2.

The connection pipeline 9 may be configured to connect the storage 8 and the second discharge pipeline 7. The connection pipeline 9 may be a pipeline for discharging the second material introduced into the storage 8 to the second discharge pipeline 7.

The connection valve V3 may be disposed in the connection pipeline 9, and may be configured to open and close the connection pipeline 9.

The second filter part F2 may be disposed in the connection pipeline 9 and may be configured to filter the materials discharged from the storage 8. Here, an operation of filtering the materials discharged from the storage 8 may mean that some of the materials discharged from the storage 8 may be allowed to pass and some of the materials may be prohibited from passing. As an example, the second filter part F2 may filter out, among the materials discharged from the storage 8, the first material "C" and may allow the second material to pass through the connection pipeline 9. The connection pipeline 9 may be a pipeline for discharging the second material, but a portion of the first material "C" may be introduced into the connection pipeline 9 together. This may reduce a purity of the second material, and thus the first material "C" may be filtered out through the second filter part F2.

The third pressure sensor P3 may be disposed in an upstream area. The upstream area may mean an area of the connection pipeline 9, which may be adjacent to the storage 8, with respect to the second filter part F2. The third pressure sensor P3 may be configured to measure a pressure of the upstream area.

The fourth pressure sensor P4 may be disposed in a downstream area. The downstream area may mean an area of the connection pipeline 9, which may be adjacent to the second discharge pipeline 7. The fourth pressure sensor P4 may be configured to measure a pressure of the downstream area.

The first detection sensor S1 may detect whether the first material "C" may be present in a reference direction, which may be one direction that may be perpendicular to the upward/downward direction. The second detection sensor S2 may be disposed on an upper side of the first detection sensor S1 and may detect whether the first material "C" may be present in the reference direction. The second detection sensor S2 may be disposed on the lower side of the upper end of the blade 5b.

The first detection sensor S1 and the second detection sensor S2 may be one or more of an inductive position sensor, a photo sensor, and a capacitive proximity sensor.

The controller 10 may include a processor 11 and a memory 12. The processor 11 may include a microprocessor such as a field Programmable gate array (FPGA), an application specific integrated circuit (ASIC), a central processing unit (CPU). The memory 12 may store instructions that may be bases for generating commands for determining whether a valve may be opened or closed, by the processor 11. The memory 12 may be data storage such as a hard disk drive (HDD), a solid state drive (SSD), a volatile medium, and a nonvolatile medium.

Control Based on Information Acquired by First and Second Detection Sensors S1 and S2

The controller 10 may be configured to perform a control to open and close the first discharge valve V1, the second discharge valve V2, and the connection valve V3, based on the information acquired by the first detection sensor S1 and the second detection sensor S2. Hereinafter, controls of, by the controller 10, opening and closing the first discharge valve V1, the second discharge valve V2, and the connection valve V3, based on the information acquired by the first detection sensor S1 and the second detection sensor S2 will be described below.

TABLE 1

| [First Condition] | | | | |
|---|---|---|---|---|
| First detection sensor | Second detection sensor | First discharge valve | Second discharge valve | Connection valve |
| Not detected | Not detected | Closed | Opened | Closed |

Figure 3:
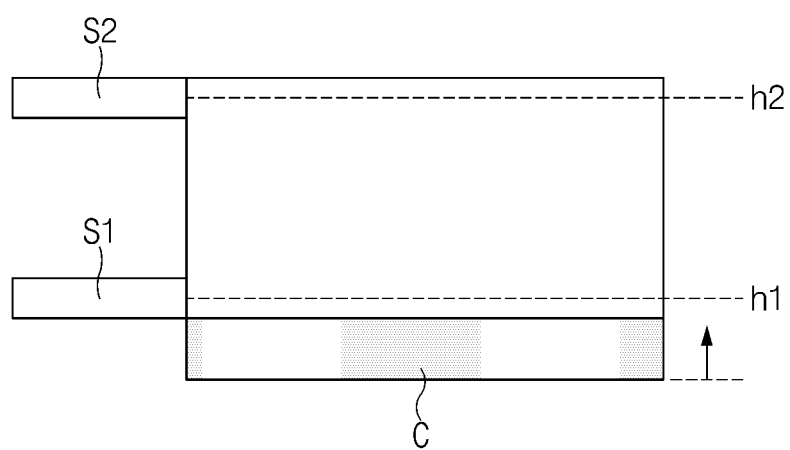
FIG. 3 is a view conceptually illustrating a first detection sensor, a second detection sensor, and a first material in a first condition.
Figure 4:
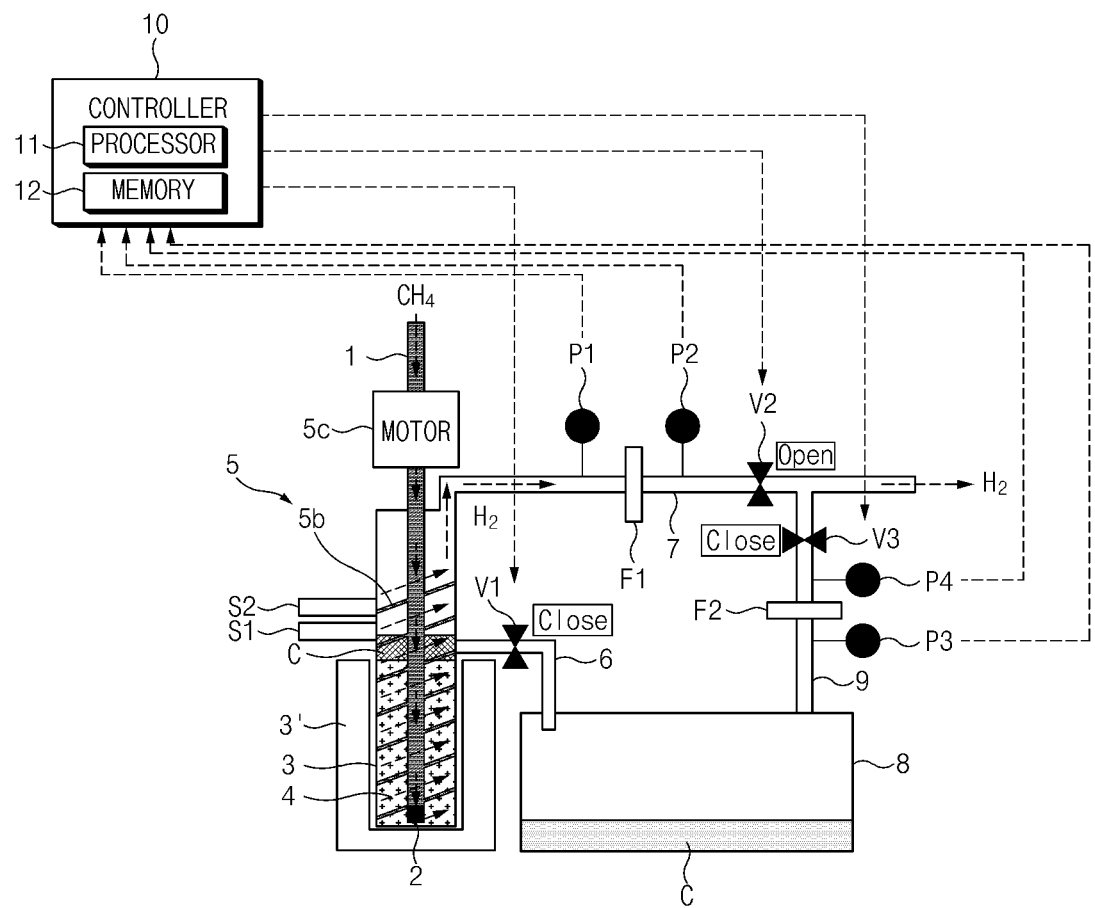
FIG. 4 is a view illustrating a methane cracking apparatus in a first condition.

FIG. 3 is a view conceptually illustrating the first detection sensor, the second detection sensor, and the first material in the first condition. FIG. 4 is a view illustrating the methane cracking apparatus in the first condition.

The first condition may mean a situation, in which the first material "C" may be detected in neither the first detection sensor S1 nor the second detection sensor S2. This may be understood as a situation, in which the first material "C" may not be sufficiently generated yet.

In this case, the controller 10 may control the first discharge valve V1 to close the first discharge pipeline 6.

Further, the controller 10 may be configured to control the second discharge valve V2 to open the second discharge pipeline 7. Through this, the second material may be discharged through the second discharge pipeline 7.

Furthermore, the controller 10 may control the connection valve V3 to close the connection pipeline 9.

TABLE 2

| [Second Condition] | | | | |
|---|---|---|---|---|
| First detection sensor | Second detection sensor | First discharge valve | Second discharge valve | Connection valve |
| Detected | Not detected | Opened | Closed | Opened |

Figure 5:
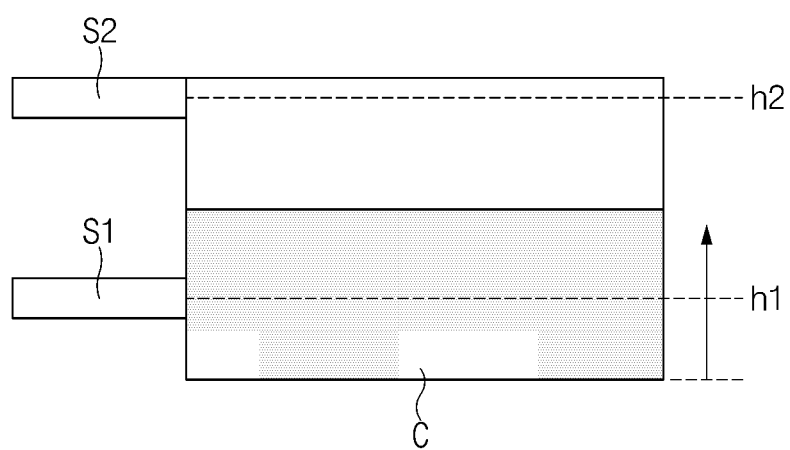
FIG. 5 is a view conceptually illustrating a first detection sensor, a second detection sensor, and a first material in a second condition.
Figure 6:
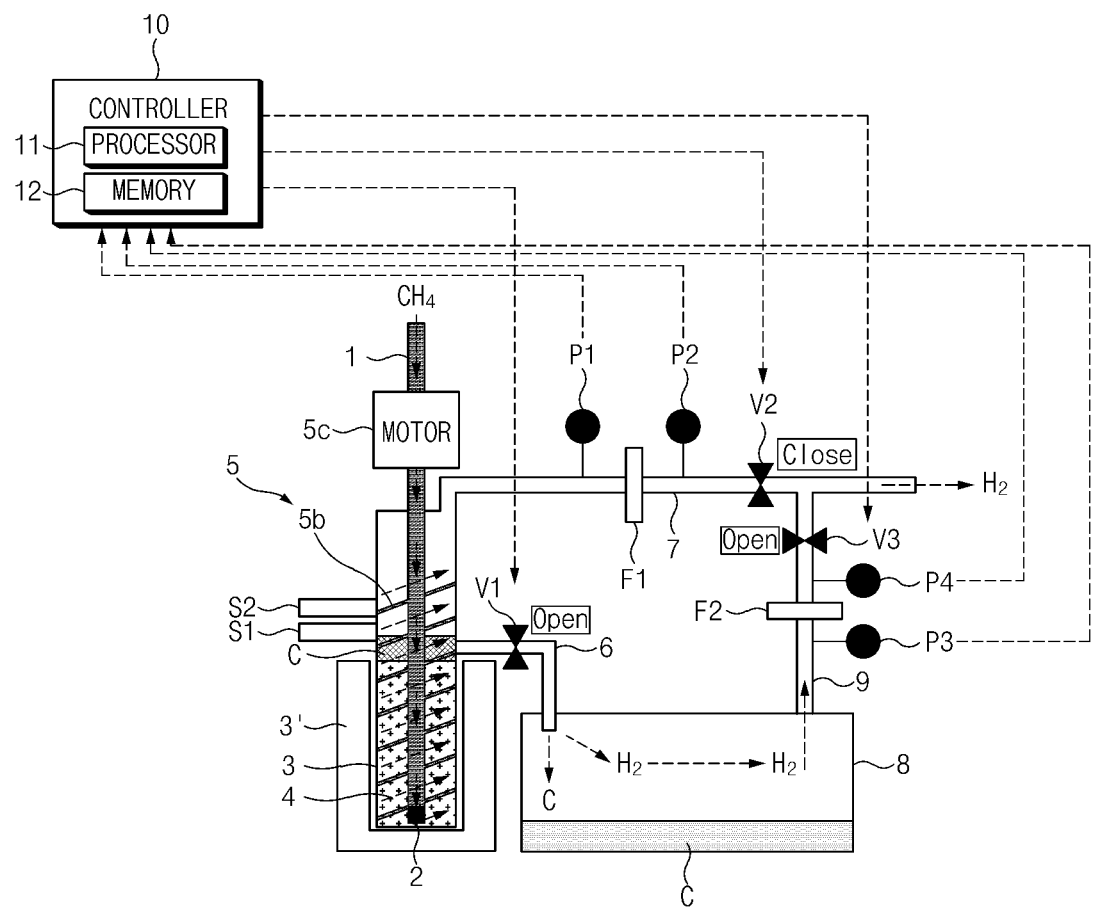
FIG. 6 is a view illustrating a methane cracking apparatus in a second condition.

FIG. 5 is a view conceptually illustrating the first detection sensor, the second detection sensor, and the first material in the second condition. FIG. 6 is a view illustrating the methane cracking apparatus in the second condition.

The second condition may mean a situation, in which the first detection sensor S1 detects the first material "C" and the second detection sensor S2 does not detect the first material "C". This may be understood as a situation, in which the first material "C" has been sufficiently generated.

In this case, the controller 10 may be configured to control the first discharge valve V1 to open the first discharge pipeline 6. The first material "C" may be stored in the storage 8 through the first discharge pipeline 6.

Further, the controller 10 may be configured to control the second discharge valve V2 to close the second discharge pipeline 7.

Furthermore, the controller 10 may be configured to control the connection valve V3 to open the connection pipeline 9. The second material introduced into the storage 8 together with the first material "C" may be discharged through the connection pipeline 9.

TABLE 3

| [Third Condition] | | | | |
|---|---|---|---|---|
| First detection sensor | Second detection sensor | First discharge valve | Second discharge valve | Connection valve |
| Detected | Detected | Opened | Opened | Opened |

Figure 7:
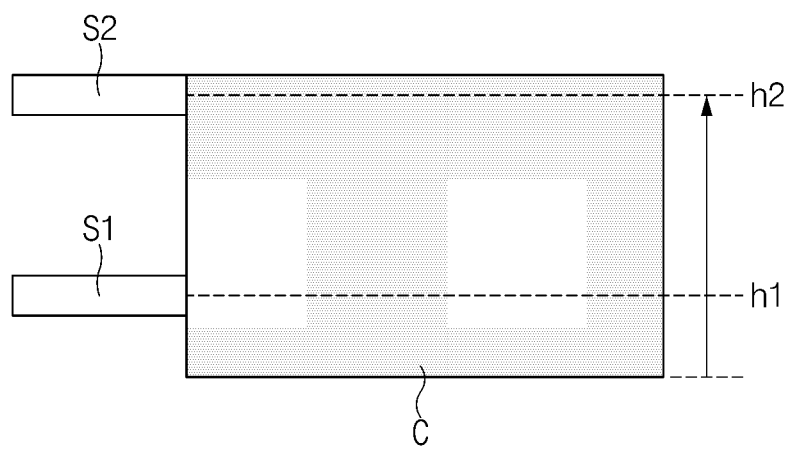
FIG. 7 is a view conceptually illustrating a first detection sensor, a second detection sensor, and a first material in a third condition.
Figure 8:
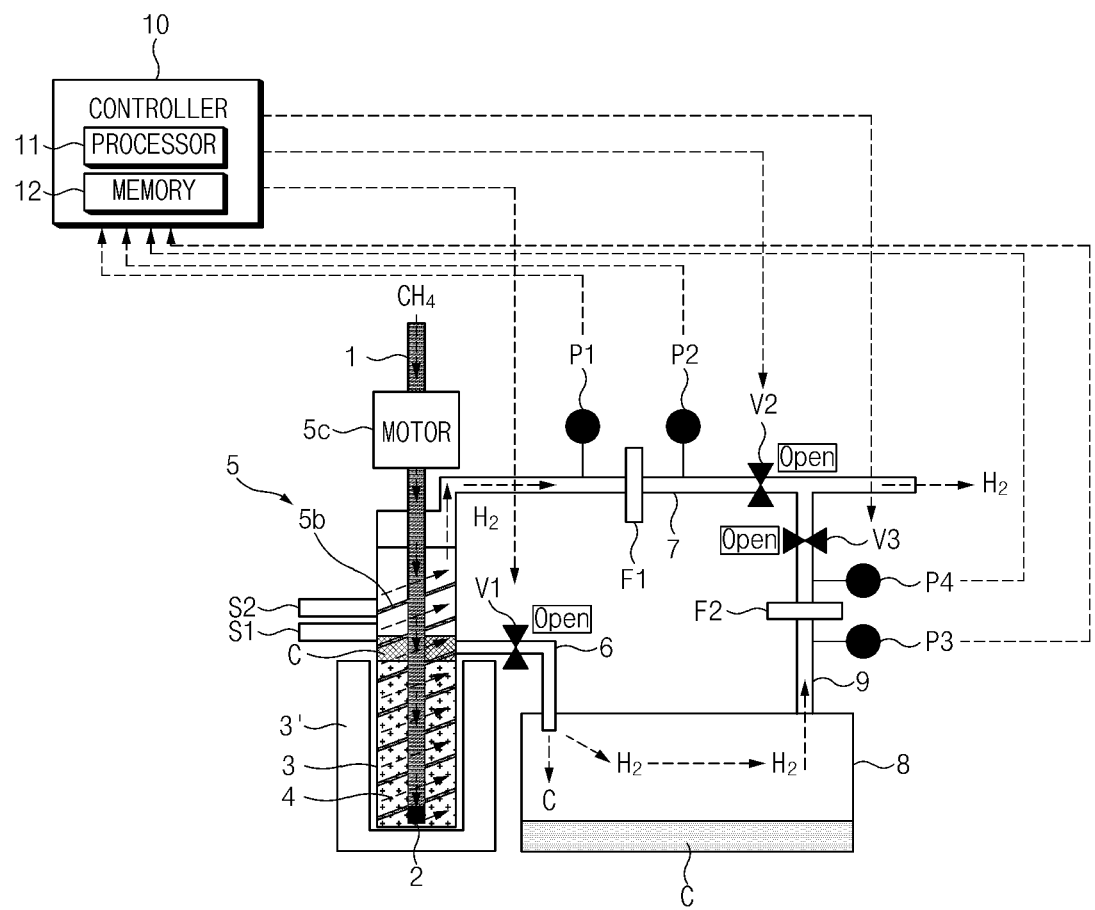
FIG. 8 is a view illustrating a methane cracking apparatus in a third condition.

FIG. 7 is a view conceptually illustrating the first detection sensor, the second detection sensor, and the first material in the third condition. FIG. 8 is a view illustrating the methane cracking apparatus in the third condition.

The third condition may mean a situation, in which the first material "C" may be detected in both of the first detection sensor S1 and the second detection sensor S2. This may be understood as a situation, in which an amount of the first material "C", which may be more than necessary, has been generated.

In this case, the controller 10 may be configured to control the first discharge valve V1 to open the first discharge pipeline 6. The first material "C" may be stored in the storage 8 through the first discharge pipeline 6.

Further, the controller 10 may be configured to control the second discharge valve V2 to open the second discharge pipeline 7. As the second discharge pipeline 7 may be opened, an internal pressure of the reactor 3 may be solved.

Furthermore, the controller 10 may be configured to control the connection valve V3 to open the connection pipeline 9. The second material introduced into the storage 8 together with the first material "C" may be discharged through the connection pipeline 9.

Furthermore, the controller 10 may be configured to generate an alarm. Furthermore, the controller 10 may stop operations of the agitator 5 and the heater 3'. This may be for the purpose of avoiding a malfunction and a dangerous situation, which may occur as the amount of the first material "C", which may be more than necessary, may be generated.

Control Based on Information Acquired by First to Fourth Pressure Sensors P1, P2, P3, and P4

The controller 10 may be configured to generate an alarm or stop the operations of the agitator 5 and the heater 3', based on the information acquired by the first pressure sensor P1, the second pressure sensor P2, the third pressure sensor P3, and the fourth pressure sensor P4. Hereinafter, controls of, by the controller 10, generating an alarm or stopping the operations of the agitator 5 and the heater 3', based on the information acquired by the first pressure sensor P1, the second pressure sensor P2, the third pressure sensor P3, and the fourth pressure sensor P4, will be described below.

When a difference between the pressure measured by the first pressure sensor P1 and the pressure measured by the second pressure sensor P2 may be larger than a specific first reference pressure, the controller 10 may generate an alarm or stop the operations of the agitator 5 and the heater 3'. The first reference pressure may be determined to an arbitrary value according to a capacity of the first filter part F1.

The description that the difference between the pressure measured by the first pressure sensor P1 and the pressure measured by the second pressure sensor P2 may be larger than the specific first reference pressure may mean a situation, in which a large amount of the first material "C" may be deposited in the first filter part F1 whereby it may be necessary to replace the first filter part F1. Thereafter, an operator may replace the first filter part F1 or check the agitator 5 or the heater 3'.

Furthermore, when a difference between the pressure measured by the third pressure sensor P3 and the pressure measured by the fourth pressure sensor P4 may be larger than a specific second reference pressure, the controller 10 may generate an alarm or stop the operations of the agitator 5 and the heater 3'. The second reference pressure may be determined to an arbitrary value according to a capacity of the second filter part F2.

The description that the difference between the pressure measured by the third pressure sensor P3 and the pressure measured by the fourth pressure sensor P4 may be larger than the specific second reference pressure may mean a situation, in which a large amount of the first material "C" may be deposited in the second filter part F2 whereby it may be necessary to replace the second filter part F2. Thereafter, an operator may replace the second filter part F2 or check the agitator 5 or the heater 3'.

Second Embodiment

Figure 9:
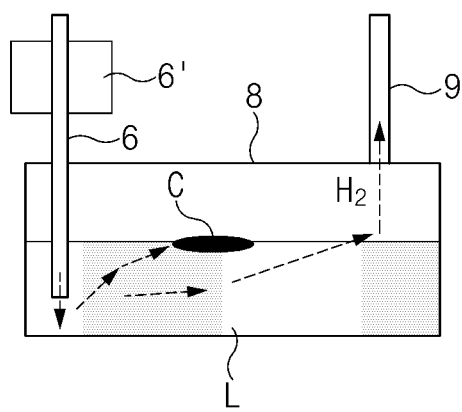
FIG. 9 is a view illustrating a heat exchanger and a storage of a methane cracking apparatus according to a second embodiment of the present disclosure.

FIG. 9 is a view illustrating a heat exchanger 6' and the storage 8 of a methane cracking apparatus according to a second embodiment of the present disclosure. Hereinafter, the methane cracking apparatus according to the second embodiment of the present disclosure will be described with reference to FIG. 9 and the above-described drawings. The methane cracking apparatus according to the second embodiment may be different from the methane cracking apparatus according to the first embodiment in that it further includes a liquid "L" in the heat exchanger 6' and the storage 8. The same or corresponding reference numerals may be given to configurations that may be the same as or correspond to those of the methane cracking apparatus according to the first embodiment, and a detailed description thereof will be omitted.

The methane cracking apparatus according to the second embodiment of the present disclosure may further include the heat exchanger 6'. The heat exchanger 6' may be coupled to the first discharge pipeline 6, and may be configured to cool the first discharge pipeline 6. The heat exchanger 6' may cool the first material "C" and the second material discharged through the first discharge pipeline 6.

The liquid "L" may be disposed in an interior of the storage 8, and an end of the first discharge pipeline 6 may be disposed to be immersed in the liquid "L". The liquid "L" may be water or alcohol. When the first material "C" and the second material may be cooled by the heat exchanger 6' and reach the liquid "L" in the storage 8, the second material may flow out of a water surface in a gaseous state to be discharged to the connection pipeline 9 and the first material "C" may be contained in the liquid "L" in a solid state.

The methane cracking apparatus according to the second embodiment may restrain the first material "C" from spattering in the storage 8 to guide discharge of the second material. Furthermore, through this, a life span of the second filter part F2 may be prolonged. Furthermore, the first material "C" of a high purity may be easily acquired from the first material "C" contained in the liquid "L" by evaporating the liquid "L".

Third Embodiment

Figure 10:
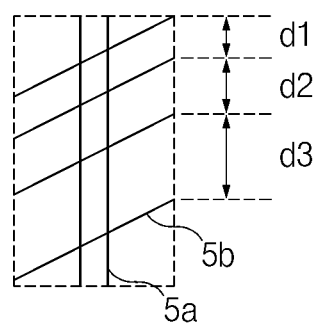
FIG. 10 is a view conceptually illustrating a blade of a methane cracking apparatus according to a third embodiment of the present disclosure.

FIG. 10 is a view conceptually illustrating the blade 5b of the methane cracking apparatus according to a third embodiment of the present disclosure. Hereinafter, the methane cracking apparatus according to the third embodiment of the present disclosure will be described with reference to FIG. 10 and the above-described drawings. The methane cracking apparatus according to the third embodiment may be different from the methane cracking apparatus according to the first embodiment in the shape of the blade 5b. The same or corresponding reference numerals may be given to configurations that may be the same as or correspond to those of the methane cracking apparatus according to the first embodiment, and a detailed description thereof will be omitted.

When the blade 5b may be divided into a plurality of areas along the upward/downward direction, pitches of at least any two of the plurality of areas of the blade 5b may be set to be different. As an example, the pitches may become gradually smaller as they go upwards. For example, when the pitches of any adjacent three areas may be a first pitch d1, a second pitch d2, and a third pitch d3 from an upper side, the first pitch d1 may be smaller than the second pitch d2 and the second pitch d2 may be smaller than the third pitch d3.

Because the pitches of the blade 5b become smaller as they go toward an upper side of the catalyst 4, a stay time of the methane in the reactor 3 may be maximized.

Fourth Embodiment

Figure 11:
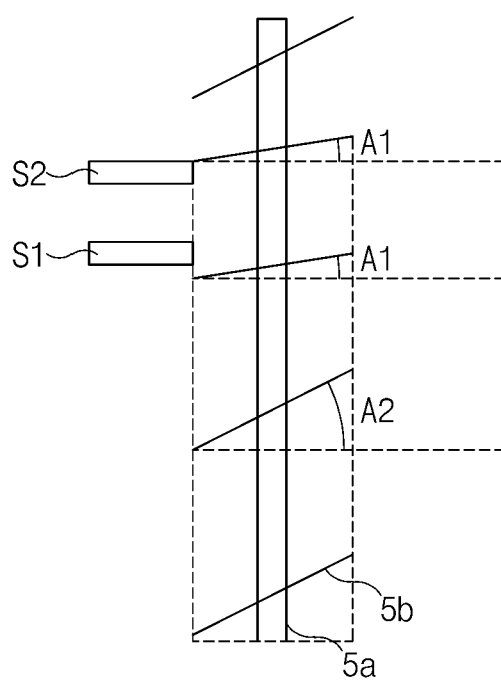
FIG. 11 is a view conceptually illustrating a blade of a methane cracking apparatus according to a fourth embodiment of the present disclosure.

FIG. 11 is a view conceptually illustrating the blade 5b of the methane cracking apparatus according to a fourth embodiment of the present disclosure. Hereinafter, the methane cracking apparatus according to the fourth embodiment of the present disclosure will be described with reference to FIG. 11 and the above-described drawings. The methane cracking apparatus according to the fourth embodiment may be different from the methane cracking apparatus according to the first embodiment in the shape of the blade 5b. The same or corresponding reference numerals may be given to configurations that may be the same as or correspond to those of the methane cracking apparatus according to the first embodiment, and a detailed description thereof will be omitted.

When the blade 5b may be divided into a plurality of areas along the upward/downward direction, reference angles of at least any two of the plurality of areas of the blade 5b may be set to be different. The reference angles may mean angles with imaginary planes that may be perpendicular to the upward/downward direction when the plurality of areas may be viewed along a direction that may be perpendicular to the upward/downward direction.

As an example, the reference angles of the areas that may be adjacent to the first detection sensor S1 and the second detection sensor S2 may be smaller than the reference angles of other areas. For example, when a reference angle of an area that may be adjacent to the first detection sensor S1 and the second detection sensor S2 may be a first angle A1 and a reference angle of another area may be a second angle A2, the first angle A1 may be smaller than the second angle A2. This may be for the purpose of reducing spattering of the first material "C" generated through a decomposition reaction and smoothly discharging the first material "C" by forming the stable first material "C".

According to the present disclosure, methane bubbles may be restrained from rising in a vertical direction through the rotating blade, a stay time of the methane in the reactor may be increased as the methane may be rotated together in a rotational direction of the blade, and a conversion rate of the methane may be increased as a contact time with the molten metal catalyst may be increased.

Exemplary embodiments described herein may be orientated relative to gravity. In this reference frame, upward/downward may be up and down along paths generally in line with gravity. In other words, upward may be away from a ground surface while downward may be toward a ground surface. The ground surface may generally be perpendicular to a direction of gravity, such as a table, floor, ground, earth, etc. upward and downward are not intended to be strictly construed as directly on top of each other along a line of gravity, but instead may encompass variation so that components that are upward or upper may be above downward or lower components and vice versa in an elevation sense, but not necessarily directly over or under the other. As illustrated, such direct relationships of over and under are also included in the present disclosure. In an exemplary embodiment, upward/downward may be used to indicate relative redirection relative to the other such that upper is in a first direction and downward is in a second direction opposite the first direction. The upward (or upper) direction relative to the downward (or lower) direction does not necessarily have to be relative to gravity.

Relative terms may be used herein, such as "small" "large" "close" etc. that can be understood by a person of skill in the art based on the instant disclosure. The person of skill in the art can use relative sizes and/or positions of other components, general sizes and/or positions of traditional components, manufacturing tolerances, etc. to be able to determine the meanings of such relative terms.

The above description may be a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure may not be provided to limit the technical spirits of the present disclosure but provided to describe the present disclosure, and the scope of the technical spirits of the present disclosure may not be limited by the embodiments. Accordingly, the technical scope of the present disclosure should be construed by the attached claims, and all the technical spirits within the equivalent ranges fall within the scope of the present disclosure.

What is claimed is:

1. A methane cracking apparatus comprising:
    a supply pipeline configured to supply a gas;
    a reactor having an interior space;
    a catalyst for decomposing the gas is disposed in the interior space;
    an agitator provided in the interior space and configured to agitate a material in the interior space;
    a first discharge pipeline connected to the reactor and configured to discharge decomposition materials generated as the gas is decomposed; and
    a second discharge pipeline connected to the reactor configured to discharge the decomposition materials, and disposed on an upper side of the first discharge pipeline,
    wherein the agitator includes:
        a rotary shaft extending upwards and downwards; and
        a blade coupled to the rotary shaft, disposed in the interior space, and configured to rotate in conjunction with rotation of the rotary shaft,
        wherein the blade as a spiral shape extending upwards and downwards while the rotary shaft is taken proximate to a center of the blade; and
    wherein the first discharge pipeline is located on a lower side of an upper end of the blade.

2. The methane cracking apparatus of claim 1, further comprising:
    a first discharge valve disposed in the first discharge pipeline and configured to open and close the first discharge pipeline.

3. The methane cracking apparatus of claim 1, wherein the second discharge pipeline is located on an upper side of an upper end of the blade.

4. The methane cracking apparatus of claim 3, further comprising:
    a second discharge valve disposed in the second discharge pipeline and configured to open and close the second discharge pipeline.

5. The methane cracking apparatus of claim 3, further comprising:
    a first filter part disposed in the second discharge pipeline and configured to filter the decomposition materials.

6. The methane cracking apparatus of claim 5, further comprising:
    a first pressure sensor disposed in the second discharge pipeline and disposed on a downstream side of the first filter part; and
    a second pressure sensor disposed in the second discharge pipeline and disposed on an upstream side of the first filter part.

7. The methane cracking apparatus of claim 1, further comprising:
    a heater coupled to an outside of the reactor and configured to heat the reactor.

8. The methane cracking apparatus of claim 1, further comprising:
    a storage connected to the first discharge pipeline and configured to store a first material that is any one of the decomposition materials.

9. The methane cracking apparatus of claim 8, further comprising:
    a connection pipeline configured to connect the storage and the second discharge pipeline.

10. The methane cracking apparatus of claim 9, further comprising:
    a second filter part disposed in the connection pipeline and configured to filter the first material discharged from the storage.

11. The methane cracking apparatus of claim 10, further comprising:

when an area of the connection pipeline, which is close to the storage with respect to the second filter part, is an upstream area and an area of the connection pipeline, which is close to the second discharge pipeline, is a downstream area, a third pressure sensor disposed in the upstream area; and a fourth pressure sensor disposed in the downstream area.

12. The methane cracking apparatus of claim 9, further comprising:

a connection valve disposed in the connection pipeline and configured to open and close the connection pipeline.

13. The methane cracking apparatus of claim 8, wherein a liquid is disposed in an interior of the storage, and wherein an end of the first discharge pipeline is disposed to be immersed in the liquid.

14. The methane cracking apparatus of claim 13, further comprising:

a heat exchanger coupled to the first discharge pipeline and configured to cool the first discharge pipeline.

15. The methane cracking apparatus of claim 1, wherein when the blade is divided to a plurality of areas along an upward/downward direction and distances, by which the plurality of areas are spaced apart from each other along the upward/downward direction, are pitches, the pitches are set to be different in at least any two of the plurality of areas.

16. The methane cracking apparatus of claim 1, wherein when the blade is divided to a plurality of areas along an upward/downward direction and angles thereof with imaginary planes that are perpendicular to the upward/downward direction when the plurality of area are viewed along a direction that is perpendicular to the upward/downward direction are reference angles, the reference angles are set to be different in at least any two of the plurality of areas of the blade.

17. The methane cracking apparatus of claim 1, further comprising:

a first detection sensor configured to detect whether a first material that is any one of the decomposition materials is present in a reference direction that is one direction that is perpendicular to an upward/downward direction; and a second detection sensor disposed on an upper side of the first detection sensor and configured to detect whether the first material is present in the reference direction.

18. The methane cracking apparatus of claim 17, further comprising:

a storage connected to the first discharge pipeline and configured to store the first material;

a connection pipeline configured to connect the storage and the second discharge pipeline;

a first discharge valve disposed in the first discharge pipeline and configured to open and close the first discharge pipeline;

a second discharge valve disposed in the second discharge pipeline and configured to open and close the second discharge pipeline;

a connection valve disposed in the connection pipeline and configured to open and close the connection pipeline; and a controller configured to open and close the first discharge valve, the second discharge valve, and the connection valve, based on information acquired by the first detection sensor and the second detection sensor.

\* \* \* \* \*